Oct. 13, 1964     O. ROTHERMEL     3,152,622
APPARATUS FOR DISCHARGING QUANTITIES
OF POURABLE MATERIAL
Filed Aug. 8, 1961                      3 Sheets-Sheet 1

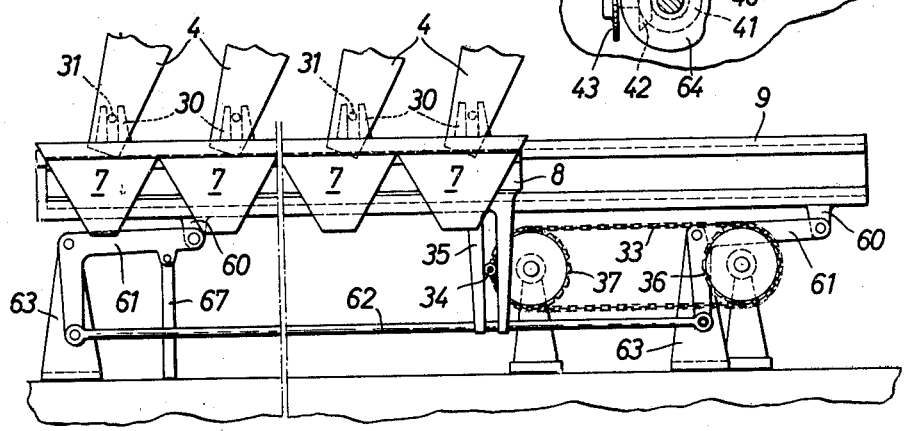

Oct. 13, 1964     O. ROTHERMEL     3,152,622
APPARATUS FOR DISCHARGING QUANTITIES
OF POURABLE MATERIAL

Filed Aug. 8, 1961     3 Sheets-Sheet 3

United States Patent Office 3,152,622
Patented Oct. 13, 1964

3,152,622
APPARATUS FOR DISCHARGING QUANTITIES
OF POURABLE MATERIAL
Otto Rothermel, Stuttgart-Hedelfingen, Germany, assignor to Firma Fr. Hesser Maschinenfabrik-Aktiengesellschaft, Stuttgart-Bad Cannstatt, Germany, a corporation of Germany
Filed Aug. 8, 1961, Ser. No. 130,023
Claims priority, application Germany Aug. 8, 1960
10 Claims. (Cl. 141—83)

This invention relates to apparatus for discharging quantities of pourable material, measured in stationary weighers, into packaging containers which are continuously fed in by an endless conveyor device of a packaging machine incorporating the weighers.

It has previously been proposed in connection with apparatus of this character, with the aim of increasing the period of time during which the packaging containers to be filled are in register with pouring chutes through which the weighers discharge, to use special intermediate chutes which accompany the packaging containers in their travel and have their delivery mouths inserted in the containers for the period that the admission openings of these chutes run beneath the discharge nozzles of the weighers. The admission openings of these intermediate chutes are considerably extended in the direction of movement thereof so as to obtain as long as possible a period of register with the discharge nozzles of the weighers. Limitations are, however, imposed by the pouring angle of the chutes, which has to be observed, and the demands on height thereby made, and it is not feasible to increase the output of this kind of discharging arrangement.

It is an object of the present invention to provide a discharging apparatus which has a higher output than known forms of apparatus, whereby the total capacity of the associated packaging machine can also be increased.

With this aim in view, the apparatus according to the present invention uses a plurality of receptacles which are disposed above the infed packaging containers and are arranged to accompany the same over a substantial part of their path of conveyed travel, and pouring chutes, corresponding in number to the weighers, which are mounted by horizontal pivots above the receptacles so as to be capable of swinging movement with the discharge nozzles of the weighers opening into the admission inlets of the pouring chutes, and that the outlets of the chutes directed towards the inlet openings of the receptacles.

In this novel form of discharging apparatus not only is the registration distance much increased by the use of pouring chutes which can be swung in a wide arc but, by using receptacles which actually dip into the packaging containers, proper transfer of the filling commodity into the latter is ensured. The result is that, even with a high rate of travel of the packaging containers there is still sufficient time for a proper and orderly discharge of the weighers.

In order to increase the output of the novel apparatus still further, in accordance with a further feature of the invention the outlet of each receptacle is equipped with closure flaps and an operating mechanism, driven in synchronism with the working movements of the machine, is arranged to operate these flaps so that the latter remain in their closed condition, to allow the weighers to be discharged into the receptacles, during times when these receptacles are not in register with the packaging containers to be filled. The receptacles are, in fact, emptied by operation of this mechanism during periods in which they are in register with the containers.

According to an optional feature of the invention the receptacles may be secured to a common rail which is operated periodically, in dependence on the speed of the conveyor device, to produce a reciprocating motion of the receptacles, or the latter can be fastened to a continuously travelling conveyor chain or the like which runs entirely, or only partially, parallel to an endless conveyor device. In the latter case again, provision can be made for the receptacle conveyor chain or the like to be offset laterally in relation to the conveyor device for packaging containers in such a way that only a straight section of the chain or the like is located above a straight section of the conveyor device.

Reference is made below to three preferred embodiments of the apparatus according to the invention, in reference to the accompanying diagrammatic drawings. In these drawings:

FIGURE 3 is a front view of this assembly.

FIGURE 4 is a side view, on an enlarged scale, of the discharging portion of the assembly of FIGURE 1.

FIGURE 5 is a front view, partly in section, of the discharging portion of FIGURE 4.

FIGURE 6 is a side view of a receptacle of the discharging apparatus, this receptacle being provided with bottom flaps.

FIGURE 11 is a side view of a modified example of the receptacle with bottom flaps.

Figure 1:
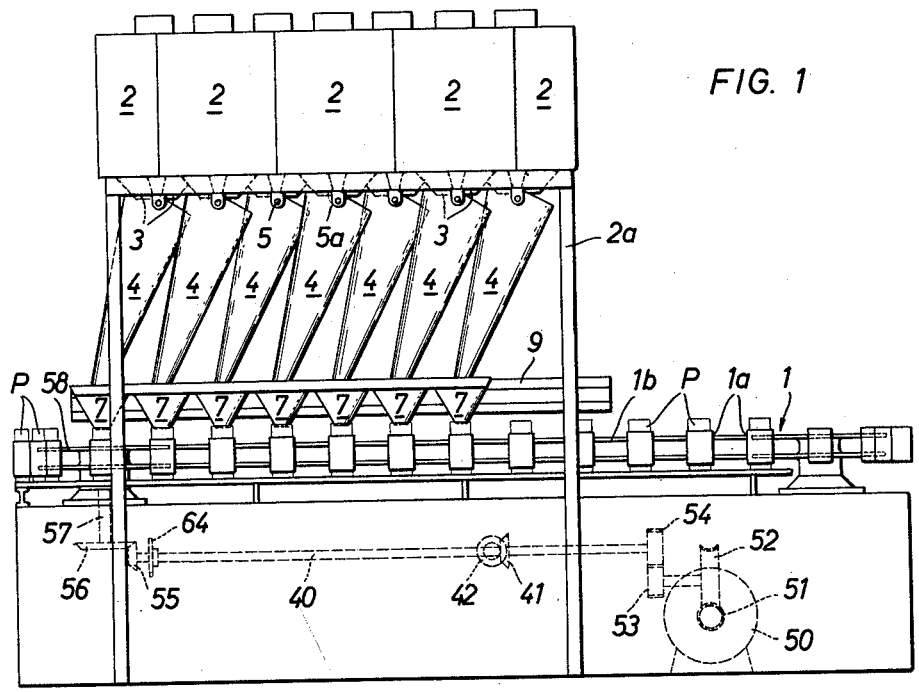
FIGURE 1 is a side view of part of a packaging machine incorporating a first embodiment of the discharging apparatus.
Figure 2:
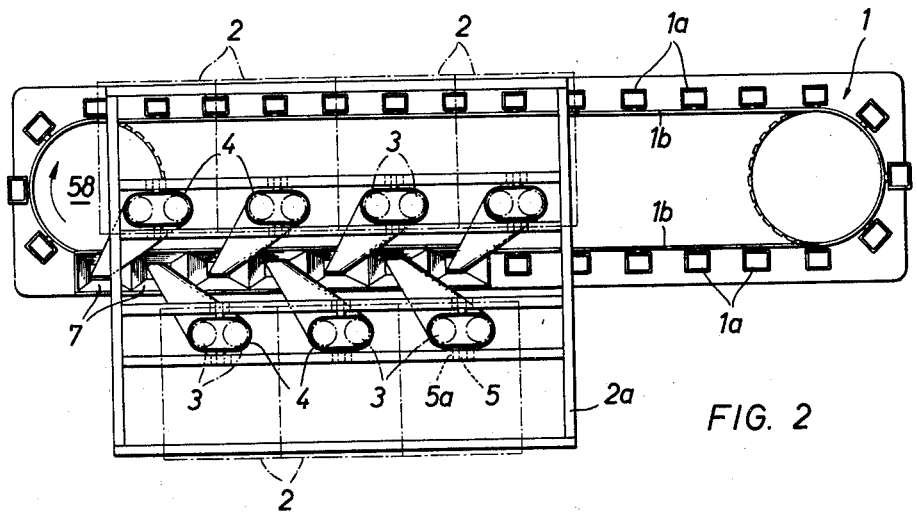
FIGURE 2 is a plan view of the assembly seen in FIGURE 1.

In the embodiments of the invention illustrated in the accompanying drawings, reference is made to a machine for filling and closing packaging containers P, which are forwarded to the filling and closing mechanisms of the machine by a continuously travelling conveyor device 1, for example an endless conveyor chain 1b equipped with receptacles 1a. The packaging containers P are filled over part of a straight section of the conveyor device 1, the latter, in fact, having a substantially oval form in plan.

The individual quantities of filling commodity are measured out in a number of automatic weighers 2, of standard commercial form, which are for example arranged in two rows extending along the aforesaid straight section of the conveyor 1, and these weighers are fixed on a framework 2a above the discharging section of the system. Each weigher 2 is made up of two separate component weighers, the discharge nozzles 3 of which open into a common pouring chute 4. The chutes 4 are mounted by pivot pins 5 on bearings 5a on the framework 2a, suchwise that they are suspended and capable of oscillating movement in the longitudinal direction of the discharging section of the system.

In the embodiment according to FIGURES 1 to 5, the outlets of the chutes 4 open into receptacles 7 which are adapted to be reciprocated in synchronism with the movements of the machine and which are fastened to a common rail 8 which is mounted for displacement in a longitudinal guideway 9. The rail 8 is suitably operated so that the receptacles 7 move to and fro above and parallel to the packaging containers P which are carried along with the conveyor device 1, the speeds of the receptacles 7 and the packaging containers P being for the most part the same, particularly where these receptacles accompany the containers. The reciprocating movements of the receptacles 7 are transmitted to the pouring chutes 4, so that the discharge from the weighers 2, that is to say from each of the two component weighers combined into the unit, takes place during the period in which the chutes 4 of the receptacles 7 are moving in the direction of travel of the conveyor device 1 with its containers P.

For the purpose of transmitting the reciprocatory movements of the rail 8 to the oscillating chutes 4, forked impelling members 30 are fastened to the rail 8 and a pin 31 arranged at the end of each chute 4 projects into the corresponding member 30.

The rail 8 is operated by a chain drive 33 which is permanently coupled, through a lateral roller 34, to a slot-provided arm 35 of the rail 8. The roller 34 is guided in the rectilinear slot in arm 35 so that reciprocatory movements of the rail 8 are produced during the uniform circulatory travel of the endless chain 33, around the two reversing wheels 36, 37 and the straight section lying between them.

The chain driving means 33, 36, 37, are operated from the main shaft 40 of the machine, through a pair of bevel pinions 41, 42 and a chain drive 43, 44, 45 to the shaft 38 and the chain wheel 37. The main shaft 40 of the machine is driven by an electric motor 50 through a worm and worm wheel gearing 51, 52 and a pair of toothed wheels 53, 54. In turn this shaft, through a pair of bevel pinions 55, 56 and a vertical shaft 57, continuously turns a reversing wheel 58 around which runs a conveyor chain 1b and the conveyor device 1.

To arrange for the receptacles 4 to dip into the containers P during the discharge operation, these receptacles, and the longitudinal guideway 9 of the rail 8 are also disposed for movement relatively to the machine in a vertical plane. For this purpose the longitudinal guideway 9 is pivotally connected by means of two lugs 60 to two bellcrank levers 61, which are connected together at their other ends by means of a link 62. The bellcrank levers 61 are pivotally mounted on fixed plummer blocks 63. The ascent and descent of the guideway 9 is brought about by means of a cam disc 64 mounted on the main shaft 40, and is transmitted to a link 67 through a rocking lever 65, which has a roller 66 running on the edge cam 64, and through this link 67 which is rectilinearly connected to the rocking lever 65 and one of the two bellcrank levers 61.

To increase the charging capacity of the apparatus, the receptacles 7 can be equipped at their outlets, as shown by FIGURE 6, with closure flaps 10, 11 which are such that the weighers 2 can discharge into the receptacles during the movement of the latter oppositely to the direction of travel of the packaging containers P, and these receptacles can then empty the measured quantities of the commodity into the containers P by opening up the closure flaps 10, 11, during their travel in company with the containers.

The operation of the closure flaps 10, 11, which also serves to distend the charging openings of the packaging containers, is performed by means of a fixed rail 12 on the machine. As the receptacles 7 descend towards the openings of the packaging containers P, levers 70, 71 connected to the flaps 10, 11 bear against the rail 12 through rollers 72, thereby opening the flaps 10, 11 against the pull of springs 73.

Figure 7:
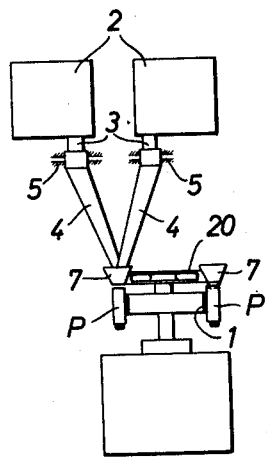
FIGURES 7 and 8 illustrate a further embodiment of the discharging apparatus, respectively as seen from the front and in plan.
Figure 8:
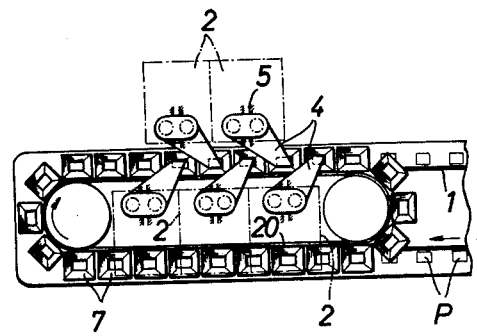

In the embodiment according to FIGURES 7 and 8, the receptacles 7 are secured to a conveyor chain 20 or the like which runs above the conveyor device 1 and continuously in company with the latter. The weighers 2 and pouring chutes 4 are again arranged above the straight section opposite the charging section for the packaging containers. In this case the weighers 2 are emptied during the swinging motion of the chutes 4 in company with the continuously travelling receptacles 7. The latter, after traversing a return section of the conveyor chain 20 or the like, register with the packaging containers P introduced by the conveyor device 1 and the individual quantities in these receptacles are emptied into the containers P by the opening of the closure flaps 10, 11 described above.

The embodiment of FIGURES 9 and 10 again discloses the arrangement of the receptacles 7 on an endless conveyor chain 21 or the like which, however, is displaced laterally of the conveyor device 1 so that only one of its straight sections is in register with a straight run of conveyor device 1. Here again the weighers 2 discharge into the receptacles 7 along a straight section of the receptacle chain 21 located opposite the section at which the containers P are filled, the receptacles 7 again discharging the contents into the packaging containers P, when in register with the latter, after traversing a return section of the conveyor path.

Figure 9:
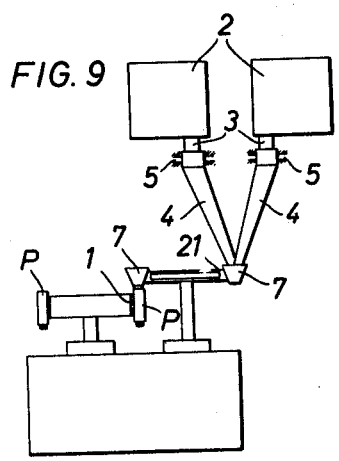
FIGURES 9 and 10 illustrate, again in front view and in plan, a third embodiment of the discharging apparatus.
Figure 10:
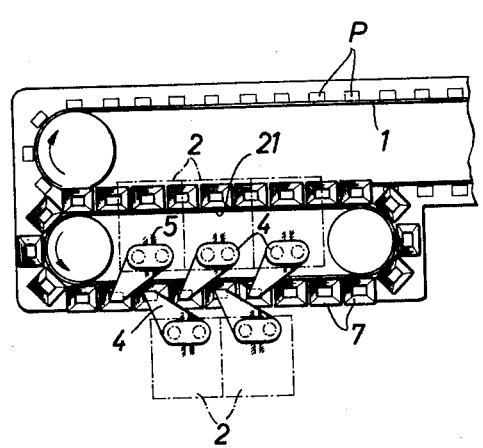

In the two embodiments illustrated in FIGURES 7 and 8, and in FIGURES 9 and 10 recpectively, it is assumed that the receptacles 7 again have bottom closure flaps 10 and 11, these being of the form illustrated in FIGURE 11. These closure flaps are operated by a cam rail 12a at a fixed position on the machine. As each receptacle 7 passes, a roller 13, which is connected to the flap 10 through a lever 14, runs on the elevated part of the cam rail 12a so as to open flap 10. The lever 14, moreover, is coupled to a further lever 15 connected to the other flap 11, so that both flaps 10, 11 are simultaneously opened against the pull of a spring 16 on rocking of the lever 14.

I claim:

1. In a packaging machine, apparatus for discharging measured quantities of pourable material into packaging containers comprising a plurality of stationary weighers having discharge outlets, a corresponding plurality of pouring chutes having filling inlets at their upper ends and delivery outlets at their lower ends, said chutes being mounted on fixed horizontal pivotal axes beneath the discharge outlets of the weighers, means for swinging said chutes in an oscillatory motion about said pivotal axes, a plurality of receptacles disposed at a lower level than the pouring chutes, means for progressing said receptacles in a path of travel of which at least one section is disposed beneath and adjacent the lower outlets of said chutes, and a container conveyor device below said receptacles, movable in a path which registers, over part of its length, with at least a section of the path of travel of the receptacles.

2. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, a line of open-topped receptacles disposed at a lower level than said pouring chutes to receive material from the delivery outlets thereof, means for progressing said receptacles in a path of travel of which at least one section is disposed beneath and adjacent the lower outlets of said chutes, and an endless container conveyor device disposed below said receptacles and movable in a path which registers, over part of its length, with at least a section of the path of travel of the receptacles.

3. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, a line of open-topped receptacles disposed at a lower level than said pouring chutes to receive material from the delivery outlets thereof, a container conveyor device below said receptacles, movable in a path which registers, over part of its length, with at least a section of the path of travel of the receptacles and means for imparting reciprocating travel to said receptacles over part of the track of said container conveyor.

4. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, an endless chain disposed at a lower level than said pouring chutes, means for continuously driving said chain, a plurality of open-topped receptacles secured to said chain, and an endless container conveyor device disposed below said receptacles and movable in a path which registers, over part of its length, with at least a section of the path of travel of the receptacles.

5. Apparatus as claimed in claim 2, in which the means for progressing said receptacles is offset laterally of the conveyor with part only of its length in register with part only of the length of the conveyor.

6. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, a plurality of receptacles disposed at a lower level than the pouring chutes, each said receptacle being opened-topped and having pivoted closure flap means at its lower part, means for progressing said receptacles in a path of travel of which at least one section is disposed beneath and adjacent the lower outlets of said chutes, an endless container conveyor device disposed below said receptacles and movable in a path which registers, over part of its length, with at least a section of the path of travel of the receptacles, a mechanical linkage operable to open said flap means periodically, and means timed with said chute-swinging means to operate said mechanical linkage.

7. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, a line of open-topped receptacles disposed at a lower level than said pouring chutes to receive material from the delivery outlets thereof, said receptacles being secured to a common rail, an endless container conveyor device disposed below said receptacles and movable in a path which registers, over part of its length, with at least a section of the path of travel of the receptacles, and means for reciprocating said rail in sympathy with the rate of travel of said conveyor device.

8. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, a line of open-topped receptacles disposed at a lower level than said pouring chutes to receive material from the delivery outlets thereof, said receptacles being mounted on a common rail, an endless container conveyor device disposed below said receptacles and movable in a path which registers, over part of its length, with at least a section of the path of travel of the receptacles, drive means for said container conveyor, and an endless driving device operable by said drive means, said driving device being coupled by a pin and slot connection to said rail, thereby to reciprocate the same in sympathy with the rate of travel of said conveyor device.

9. In a packaging machine, apparatus for discharging measured quantities of pourable material into packaging containers comprising a plurality of stationary weighers having discharge outlets, a corresponding plurality of pouring chutes having filling inlets at their upper ends and delivery outlets at their lower ends, said chutes being mounted on fixed horizontal pivotal axes beneath the discharge outlets of the weighers, means for swinging said chutes in an oscillatory motion about said pivotal axes, a plurality of receptacles disposed at a lower level than the pouring chutes, means for progressing said receptacles in a path of travel of which at least one section is disposed beneath and adjacent the lower outlets of said chutes, a container conveyor device disposed below said receptacles and movable in a path which registers, over part of its length, with at least a section of the path of travel of the receptacles, and means for lowering each said receptacle towards the conveyor device over the registering path of travel.

10. In a packaging machine, apparatus for discharging measured quantities of pourable material into packaging containers comprising a plurality of stationary weighers having discharge nozzles, a corresponding plurality of pouring chutes having filling inlets at their upper ends and delivery outlets at their lower ends, said chutes being mounted on fixed horizontal pivotal axes beneath the discharge outlets of the weighers with the nozzles of the latter entering the filling inlets of said chutes, means for swinging said chutes in an oscillatory motion about said pivotal axes, a line of open-topped receptacles disposed at a lower level than said pouring chutes to receive material from the delivery outlets thereof, said receptacles being mounted on a common rail, an endless container conveyor device disposed below said receptacles and movable in a path which registers, over part of its length, with at least a section of the path of travel of the receptacles, drive means for said container conveyor, a cam drivingly coupled to said drive means, and a lever and linkage transmission system between said cam and said common rail.

References Cited in the file of this patent
UNITED STATES PATENTS

| 2,678,185 | Howard | May 11, 1954 |
| 3,045,720 | Jungmayr | July 24, 1962 |

FOREIGN PATENTS

| 286,701 | Italy | June 19, 1931 |